United States Patent [19]

Wilger et al.

[11] Patent Number: 4,580,931

[45] Date of Patent: Apr. 8, 1986

[54] IN-SITU MACHINE FOR REFURBISHING A BORE IN A WORKPIECE

[75] Inventors: John F. Wilger, Honolulu; Gregory Nakano, Pearl City; Stephen Orillo, Jr., Mililani Town; Teikichi Higa, Pearl City; William A. Berman, Honolulu, all of Hi.

[73] Assignee: The United States of America as represented by the Secretary of the Navy, Washington, D.C.

[21] Appl. No.: 561,843

[22] Filed: Dec. 15, 1983

[51] Int. Cl.4 .................. B23B 39/14; B23B 47/18; B23B 45/14

[52] U.S. Cl. .................. 408/72 R; 408/708; 408/709; 82/1.4

[58] Field of Search .............. 408/54, 72 R, 75, 708, 408/709, 80–83, 83.5; 82/1.4

[56] References Cited

U.S. PATENT DOCUMENTS

| | | | |
|---|---|---|---|
| 349,963 | 9/1886 | Watson et al. | 408/81 X |
| 807,755 | 12/1905 | Loyd | 408/81 |
| 1,217,481 | 2/1917 | Mewes | 82/1.4 |
| 2,392,564 | 1/1946 | Wrenn | 77/2 |
| 2,413,574 | 12/1946 | Mitchell | 77/2 |
| 2,416,402 | 2/1947 | Mitchell | 408/72 X |
| 2,638,802 | 5/1953 | Froussaro | 82/1.4 |
| 2,657,595 | 11/1953 | Shaff | 77/33.5 |
| 3,141,364 | 7/1964 | Kelley et al. | 82/4 |
| 3,234,826 | 2/1966 | Gill | 82/4 |
| 3,640,147 | 2/1972 | Fantoni | 74/424.8 R |
| 3,751,175 | 8/1973 | Brooks | 408/72 |
| 3,767,316 | 10/1973 | Dumont, Jr. | 408/82 X |
| 4,011,793 | 3/1977 | Grimsley | 408/80 X |
| 4,050,836 | 9/1977 | Anders | 408/130 X |
| 4,175,471 | 11/1979 | Wilger et al. | 408/83.5 |
| 4,359,917 | 11/1982 | Wilger et al. | 82/4 R |
| 4,427,324 | 1/1984 | Fransson et al. | 409/12 |

Primary Examiner—Gil Weidenfeld
Assistant Examiner—Steven C. Bishop
Attorney, Agent, or Firm—Robert F. Beers; Ervin F. Johnston; Thomas Glenn Keough

[57] ABSTRACT

An in situ machine is provided for refurbishing a bore in a workpiece. The machine includes a shaft which is adapted to be fixed to the workpiece in axial alignment therewith. A tubular boring element is concentrically mounted for rotation about the fixed shaft and is adapted to extend into the workpiece bore. A cutting head is slidably mounted on the boring element for reciprocable movement therealong. A device is provided for rotating the boring element and cutting means, and another device, which is responsive to the rotating device, is provided for advancing the cutting head along the boring element.

11 Claims, 13 Drawing Figures

IN-SITU MACHINE FOR REFURBISHING A BORE IN A WORKPIECE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Present day submarines have heavy bores which serve as bearings for steering, diving and fairwater planes tillers. These bearing bores are subjected to extremely heavy loads, and with time become out of round. Various methods are periodically utilized to refurbish the bearing bores back into a round condition. Bearing bores characteristically come in pairs in order to withstand the tremendous lateral forces exerted by the tillers. It is important in any refurbishment process that each pair of bearing bores be trued to a round condition in axial alignment with one another. One present day method of refurbishing bearing bores is a cylindrically shaped hone which is revolved by a hand drill. This method is extremely slow and is not very accurate in returning a bearing bore to a rounded shape or in maintaining the axial alignment between bearing bores in a pair. Another method of refurbishing tiller bearing bores is to completely remove the tiller bearing bores from its assembly aboard ship and take it to a machine shop where it can be returned to its true state on a boring mill. This method results in accurate refurbishment. However the removal of the tiller bearing bores also requires the removal of the propeller, the propeller shafting, and the control surfaces as well as many interfering structures. Consequently, the removal and replacement time of tiller bearing bores is very costly.

STATEMENT OF THE INVENTION

The present invention provides a machine which can be mounted in place to a pair of bearing bores for refurbishing the bores accurately to an aligned round condition. This has been accomplished by providing the machine with a shaft which is adapted to be fixed to the workpiece of the bearing bores in axial alignment therewith. A tubular boring element is concentrically mounted for rotation about the fixed shaft and is adapted to extend into the respective workpiece bore. The cutting head is slidably mounted on the boring element for reciprocable movement therealong. A device is provided for rotating the boring element and cutting means, and another device, which is responsive to the rotating device, is provided for advancing the cutting head along the boring element.

OBJECTS OF THE INVENTION

An object of the present invention is to provide a machine which can be used in place for refurbishing a bore in a workpiece.

Another object is to provide a machine which can be used in place for accurately refurbishing a pair of bores to a true round condition with axial aignment therebetween.

A further object is to provide a machine which can be mounted to a bearing bore and then run automatically to rotate and advance a cutting head in the bore for refurbishment purposes.

Still another object is to provide a low cost machine which can be used in place to accurately refurbish a pair of bearing bores for a shipboard tiller.

These and other objects of the invention will become more readily apparent from the ensuing description and claims when taken with the appended drawings.

DESCRIPTION OF THE PREFERRED EMBODIMENT

Figure 1:
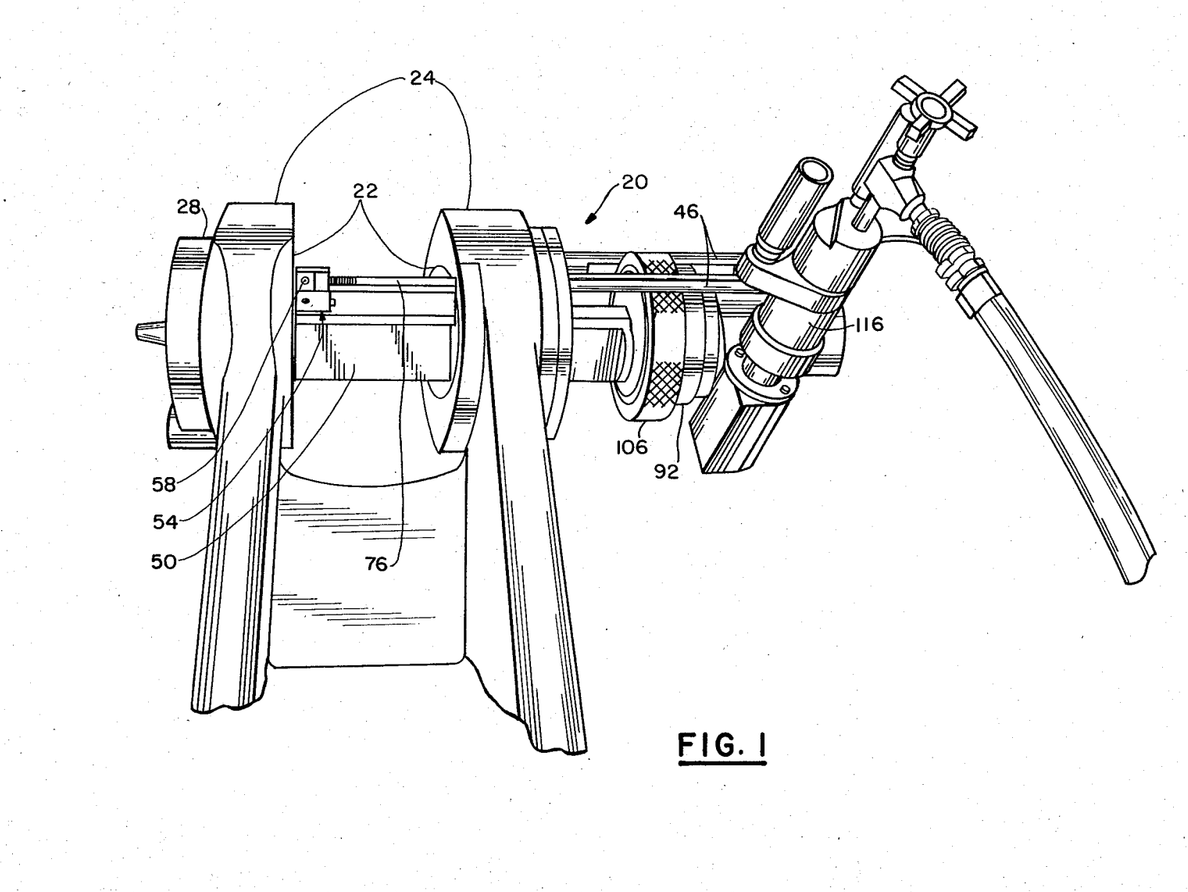
FIG. 1 is a perspective illustration of the present machine mounted in place in a pair of bearing bores for refurbishing the bores to a true rounded condition in axial alignment with one another.

Referring now to the drawings wherein like reference numerals designate like or similar parts throughout the several views there is illustrated in FIG. 1 a boring machine 20 which is utilized for refurbishing a bore in a workpiece, such as a pair of bores 22, these bores being axially aligned for receiving a tiller (not shown) which in turn is connected to steering, diving, or fairwater planes (not shown) aboard an ocean going vessel. The bearings 24 containing the bores 22 have not been removed from the vessel since the boring machine 20 can perform its refurbishing boring job in place.

Figure 2:
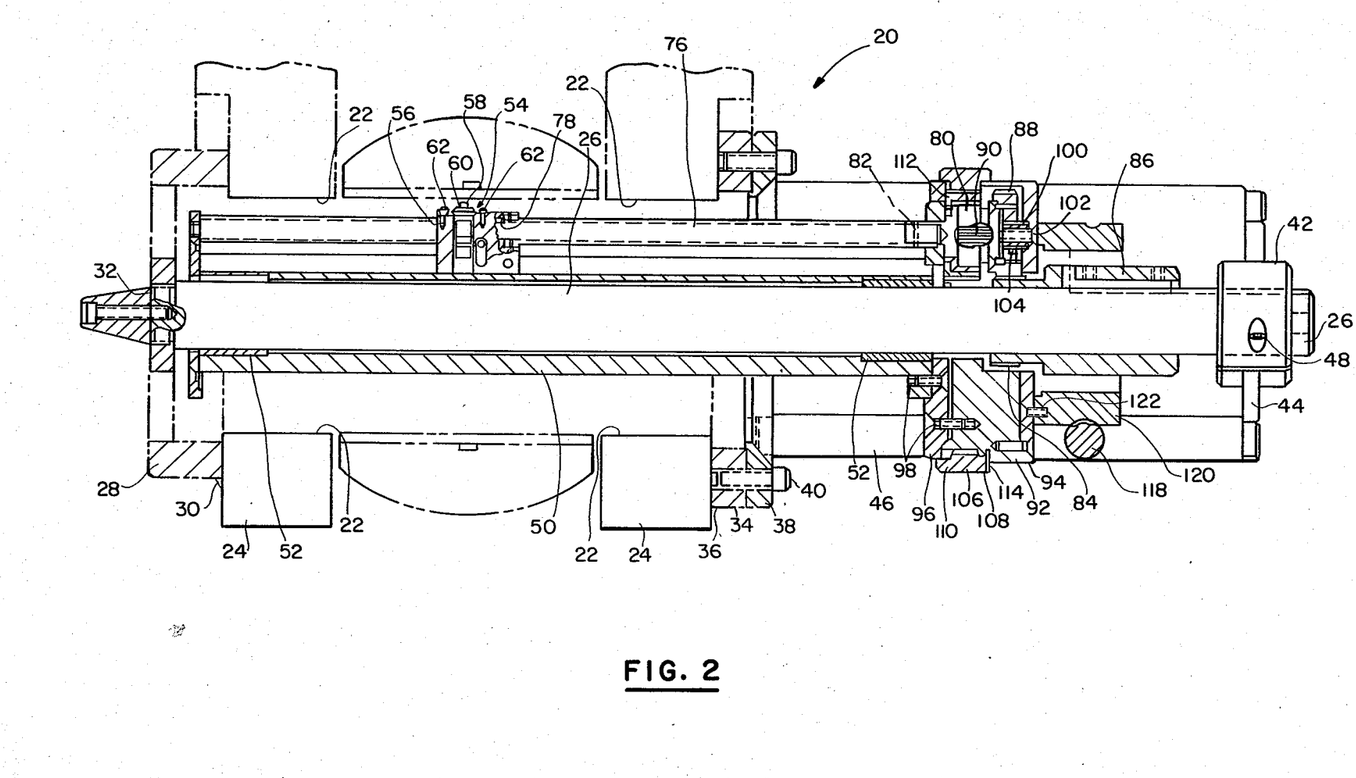
FIG. 2 is a longitudinal cross-sectional view through the present machine mounted in a pair of bearing bores.

As illustrated in FIG. 2 the boring machine 20 includes a shaft 26 which is adapted to be fixed to the bearings 24 in axial alignment with the bores 22. The shaft 26 may be fixed to the left bearings 24 by a cup-shaped plate 28 which is welded at 30 to an end of one of the bearings 24, the shaft 26 in turn being threaded into this plate at 32. The shaft 26 may be fixed to the right bearing by an annular plate 34 which is welded to the other bearing 24 at 36, and a plate 38 which is connected to the plate 34 by bolts 40. At the right end of the shaft 26 there may be fixedly mounted a hub 42 which has an annular flange 44, the annular flange 44 being fixedly connected to the plates 44 and 38 by rods 46 (one being shown in FIG. 1). The hub 42 may be split for facilitating installation and may be held in place by a socket head screw 48. With this arrangement the shaft 46 is firmly fixed at both ends to the bearings 24 which contain the bores 22.

A tubular boring element 50 is concentrically mounted for rotation about the fixed shaft 26 and is adapted to extend into the bores 22 of the bearings 24. The boring element 50 may be rotatably mounted on the fixed shaft 26 by bearings 52.

Figures 7, 8, 9, 10:
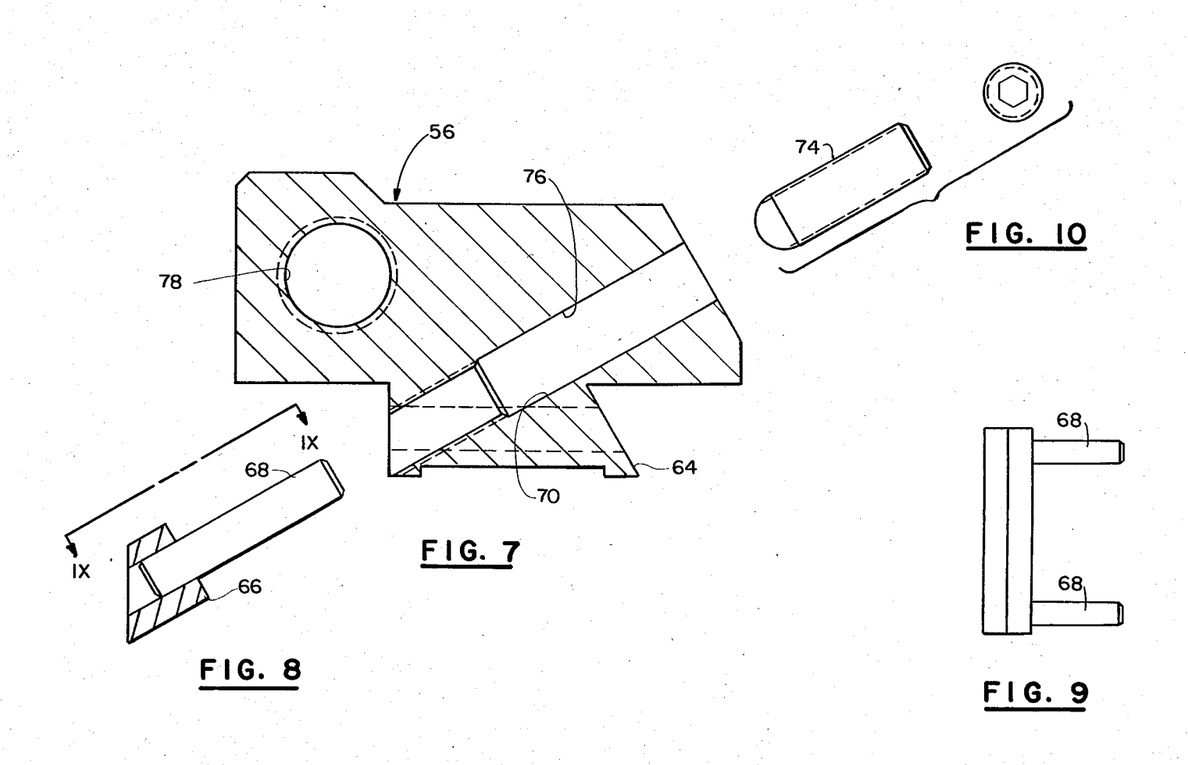
FIG. 7 is an enlarged cross-sectional view taken along plane VII—VII of FIG. 6.
FIG. 8 is a side cross-sectional view of a jib which is utilized in combination with the tool bit holder of FIGS. 4 through 7.
FIG. 9 is a view taken along plane IX—IX of FIG. 8.
FIG. 10 is a side view of a screw which fits into the tool bit holder of FIGS. 4 through 7 against the jib of FIGS. 8 and 9.
Figure 11:
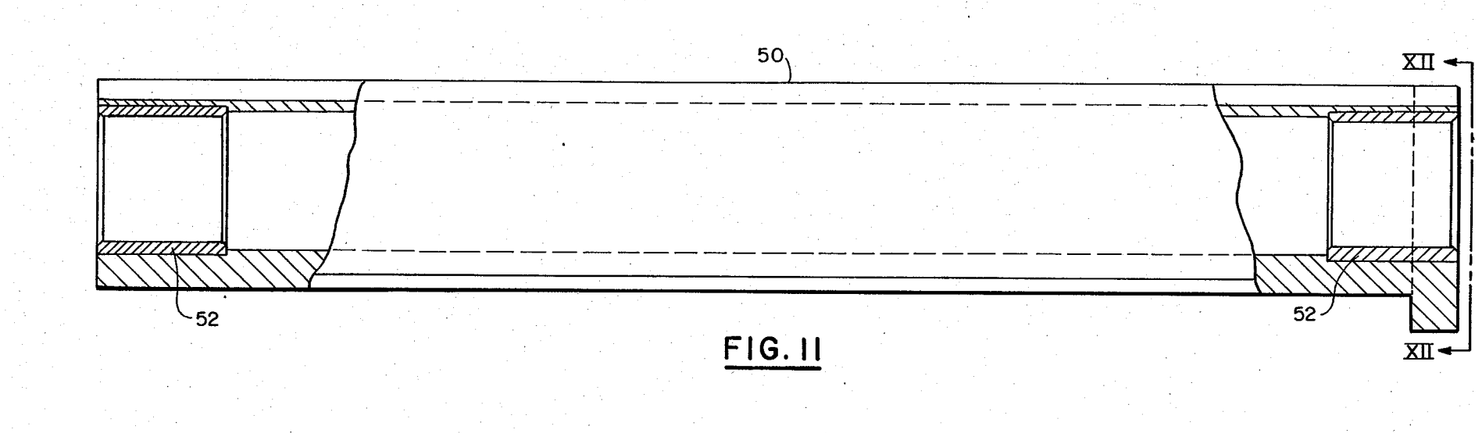
FIG. 11 is a longitudinal side view of the boring bar with end portions cut away to show various details thereof.
Figure 12:
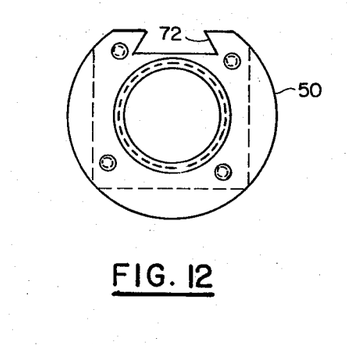
FIG. 12 is a view taken along plane XII—XII of FIG. 11.
Figure 13:
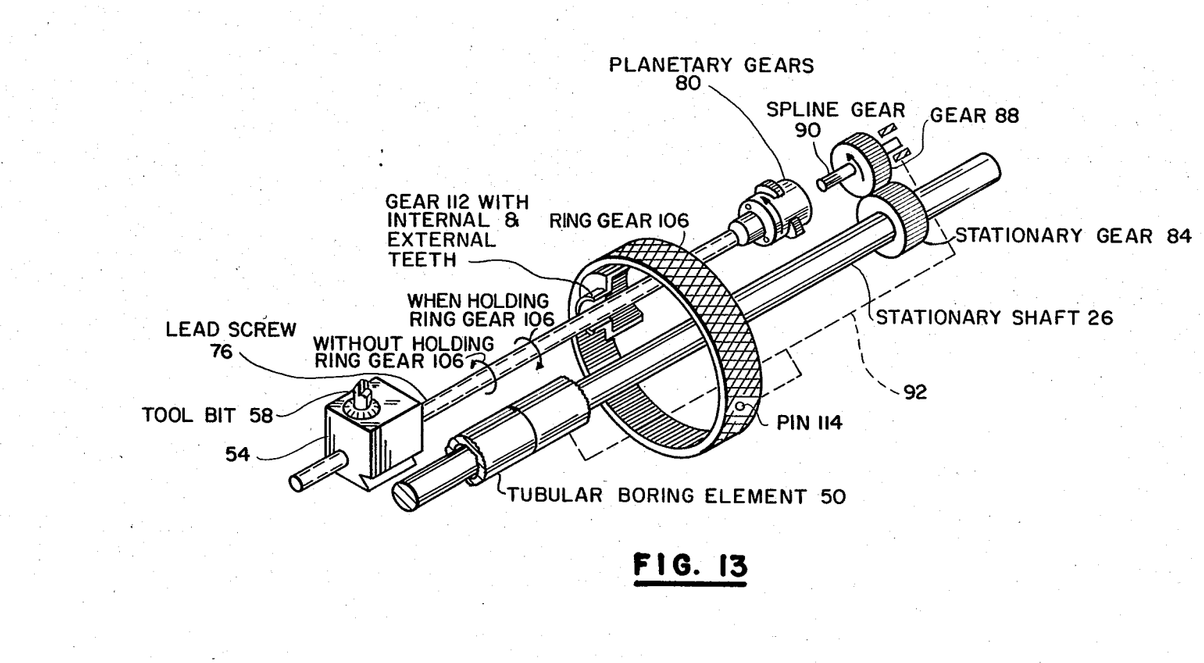
FIG. 13 is an exploded isometric schematic illustration of the various gears utilized in the present invention.

A cutting means 54 is slidably mounted on the boring element 50 for reciprocable movement thereon. The cutting means may include a tool bit holder 56 and a cutting bit 58 which is held in place by a plate 60 and bolts 62. As shown in FIGS. 7 and 8 the tool bit holder 56 may have a partial dovetail bottom portion 64, which dovetail is completed by a jib 66. The jib 66 has ends 68 which are slidable within openings 70 in the holder 56. As shown in FIGS. 11 and 12 the boring element 50 is provided with a dovetail slot 72 which is adapted to receive the holder 56. A screw 74 (see FIG. 10) is threaded into the holder in the threaded opening 76 for snugly arranging the jib 66 within the boring element slot 72.

Means are provided for advancing the cutting means 54 along the boring element 50 an incremental amount for each revolution of the boring element 50 and cutting means 54 about the fixed shaft 26. The advancing means may include a lead screw 76 which is threaded into the cutting means at 78. Means are provided for rotating the lead screw 76 as the boring element 50 is rotated. This means may include a planetary gear 80 which is connected to the lead screw 76 by any suitable means, such as a pin 82. A spur gear 84 is fixedly connected about the fixed shaft 26 by any suitable means, such as a key 86. Gear means are provided for interconnecting the fixed spur gear 84 to the planetary gear 80. This interconnecting gear means may include a spur gear 88 which is meshed with the fixed spur gear 84 and a spline 90 which is meshed with the planetary gear 80. Means are fixed to the boring element 50 and are rotatable therewith for rotatably mounting the interconnecting gear means 88 and 90. This mounting means may include a gear housing 92 which includes a plate 94, the housing 92 being fixedly connected to the boring element 50 by a plate 96 and bolts 98. The spur gear 88 is rotatably mounted to the plate 94 of the housing 92 by a bushing 100, which is held in place by a bolt 102, and a needle type bearing 104.

The means for rotating the lead screw 76 may further include an internal tooth ring gear 106 which is rotatably mounted on the housing 92 and plate 96 at 108 and 110 respectively. This arrangement places the ring gear 106 so that it is concentric with the boring element 50. A second gear means interconnects the ring gear 106 to the planetary gear 80. This second gear means may be a gear 112 which has external teeth meshing with the internal teeth of the ring gear 106 and internal teeth which mesh with the planetary gear 80. Means, such as a pin 114 is provided for selectively fixing the ring gear 106 to the rotatable housing 92.

Figure 3:
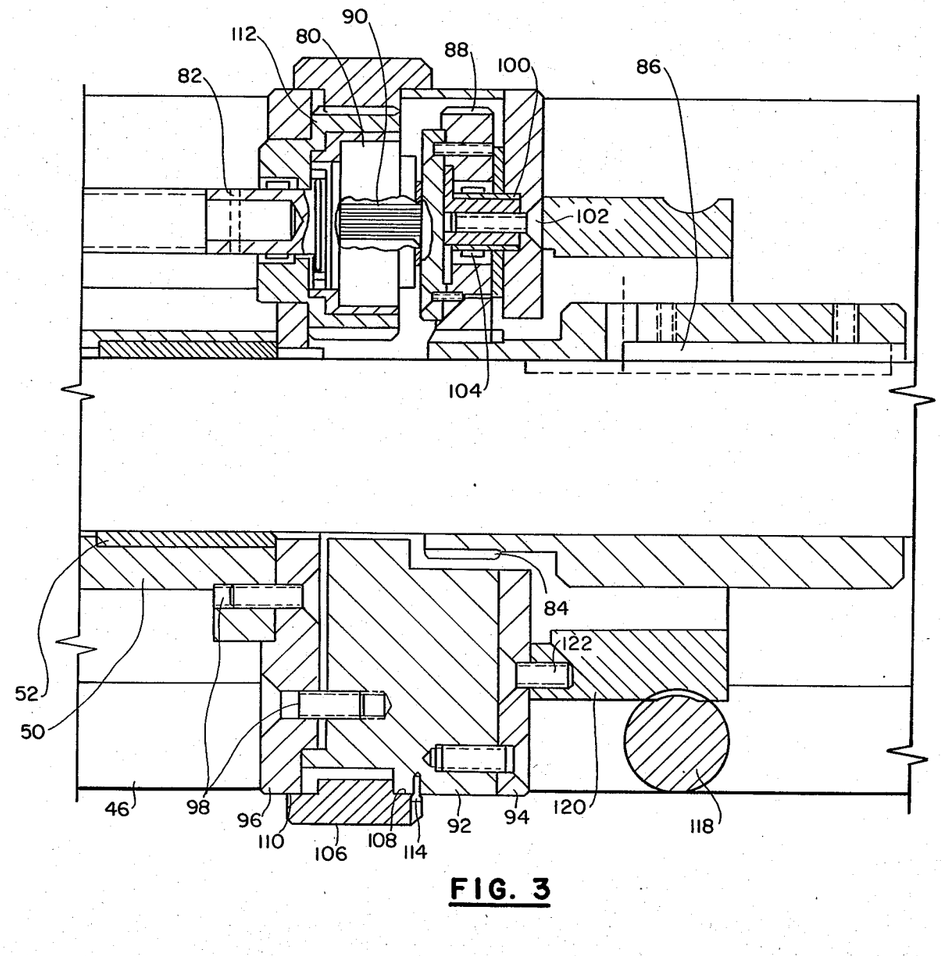
FIG. 3 is an enlarged view of a portion of FIG. 2 so as to illustrate in more detail the gearing arrangement involved in the invention.
Figure 4:
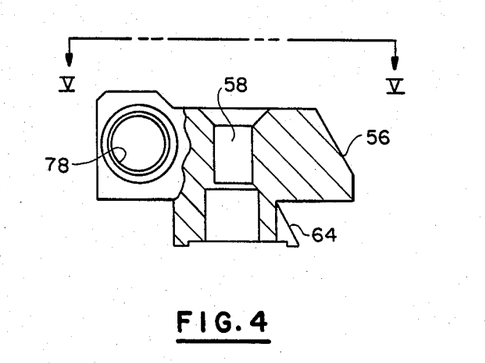
FIG. 4 is an end view of a tool bit holder utilized with the present machine with a portion cut away to illustrate a detail thereof.
Figure 5:
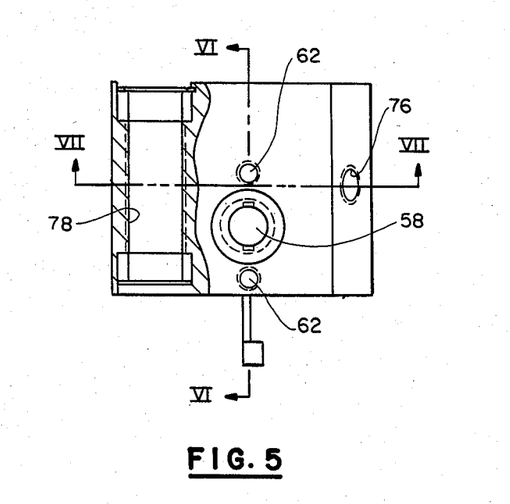
FIG. 5 is a view taken along plane V—V of FIG. 4 with a portion cut away to show a detail thereof.
Figure 6:
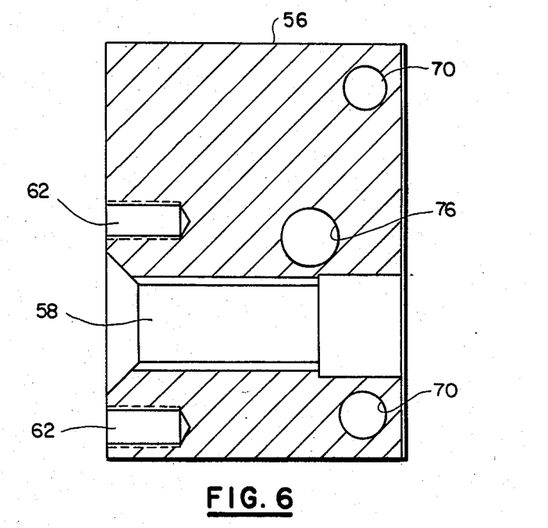
FIG. 6 is an enlarged cross-sectional view taken along plane VI—VI of FIG. 5.

A power means may be provided for rotating the gear case 92 about the fixed shaft 26. The power means may include an air motor 116 (FIG. 1) which has a worm gear 118 (FIG. 3) which is mounted to its output shaft. A worm wheel 120, which meshes with the worm gear 118, may be fixedly mounted to the plate 94 of the gear case 92 by any suitable means such as bolts 122.

In the exemplary embodiment of this invention the advance of the tool bit 58 is 0.0076 inches per revolution of the gear case 92. This is accomplished by providing the gears with the following number of teeth: gear 84 with 30 teeth, gear 88 with 30 teeth, gear 90 with 7 teeth and gear 80 with 45 teeth.

OPERATION OF THE INVENTION

In the operation of the invention the boring machine 20 is taken to the site of the bearings 24. The plates 28 and 34, which are detached from the remainder of the machine, are welded in place as illustrated in FIG. 2. The shaft 26 along with the remainder of the machine is inserted in place with the left end of the shaft 26 threaded tightly into the plate 28 and the bolts 40 inserted in the plates 34 and 38. In order to position the tool bit 58 in a proper starting position the pin 114 is withdrawn and the ring gear 106 is rotated. This causes gear 112 to rotate the planetary gear 80 which in turn walks around the spline gear 90. While the spline gear 90 remains stationary the lead screw 76 is rapidly rotated to bring the tool bit assembly 54 to a starting position just outside one of the bores 22. The tool bit is then adjusted for the proper cut by loosening plate 60, making the adjustment, and then tightening the plate with the screws 62. The pin 114 is then inserted to lock the ring gear 106 to the gear case 92, and the air motor 116 is started. The worm 118 then turns the wormwheel 120 which causes the gear case to rotate about the fixed shaft 26. When this occurs the gear 88 will walk around the fixed gear 84. This causes spline gear 90 to rotate the planetary gear 80 which in turn rotates the lead screw 76 because of its connection thereto. During this operation the planetary gear 80 walks around the interior teeth of the gear 112 which is locked to the ring gear 106. The same cuts are made on both bores 22 until they are completely refurbished and in exact alignment with one another, after which time the boring machine can be removed from the bearings 24. The plates 28 and 34 are then cut away from the bearings and the bearings are ready to be assembled with their mating components for operation.

Obviously, many modifications and variations of the present invention are possible in the light of the above teachings. It is therefore to be understood that within the scope of the appended claims the invention may be practiced otherwise than as specifically described.

What is claimed is:

1. An in situ machine for refurbishing a bore in a workpiece comprising:
   a shaft which is adapted to be fixed to the workpiece in axial alignment therewith;
   a tubular boring element concentrically mounted about the fixed shaft for rotation therearound and adapted to extend into the workpiece bore;
   cutting means; and
   means interconnecting the cutting means to the boring element for rotating the cutting means about the fixed shaft and automatically advancing the cutting means along the boring element an incremental amount for each revolution of the cutting means about the fixed shaft.

2. A machine as claimed in claim 1 wherein the rotating and automatic advancing means includes:
   a lead screw threaded into the cutting means; and means drivingly interconnecting the lead screw to the boring element for automatically and simultaneously rotating the lead screw about the fixed shaft axis and about its own axis as the boring element is rotated.

3. A machine as claimed in claim 2 wherein the means for automatically and simultaneously rotating the lead screw includes:
a planetary gear means fixedly connected to the lead screw in axial alignment therewith and having at least one planetary gear which is rotatable about its axis, which latter axis is spaced from and parallel to the lead screw axis;
a spur gear fixedly connected about the fixed shaft;
gear means drivingly interconnecting the fixed spur gear to the planetary gear; and
means rigidly fixed to the boring element and rotatable therewith for rotatably mounting the interconnecting gear means.

4. A machine as claimed in claim 3 including:
power means for rotating the mounting means about the fixed shaft.

5. A machine as claimed in claim 3 wherein the interconnecting gear means includes:
a spur gear which is meshed with the fixed spur gear and a spline which is meshed with the planetary gear.

6. A machine as claimed in claim 3 wherein the means for automatically and simultaneously rotating the lead screw includes:
an internal tooth ring gear rotatably mounted on the mounting means so as to be concentric with the boring element;
second gear means interconnecting the ring gear to the planetary gear; and
means for selectively fixing the ring gear to the rotatable mounting means.

7. A machine as claimed in claim 6 including:
the second gear means having external teeth meshing with the internal teeth of the ring gear and having internal teeth meshing with the planetary gear.

8. A machine as claimed in claim 7 including:
the mounting means including a housing for the gears; and
power means for rotating the mounting means about the fixed shaft.

9. A machine as claimed in claim 8 wherein the first mentioned interconnecting gear means includes:
a spur gear which is meshed with the fixed spur gear and a spline which is meshed with the planetary gear.

10. A machine as claimed in claim 6 wherein the means for selectively fixing the ring gear to the rotatable mounting means includes:
a hole in the ring gear and a hole in the rotatable mounting means; and
a pin adapted to fit into each of said holes.

11. A machine as claimed in claim 1 including:
means for fixing the fixed shaft to the workpiece completely outside the bore of the workpiece so that the machine is capable of refurbishing the entire bore of the workpiece.

* * * * *